United States Patent [19]

Sakashita

[11] Patent Number: 5,585,780
[45] Date of Patent: Dec. 17, 1996

[54] TRAVELING STATE CALCULATING DEVICES

[75] Inventor: Toshiaki Sakashita, Tokyo, Japan

[73] Assignee: Casio Computer Co., Ltd., Tokyo, Japan

[21] Appl. No.: 262,473

[22] Filed: Jun. 20, 1994

[30] Foreign Application Priority Data

Jun. 29, 1993 [JP] Japan .................................. 5-185625

[51] Int. Cl.⁶ .................................................. B60R 25/10
[52] U.S. Cl. ...................... 340/432; 340/539; 455/34.1; 455/34.2; 455/63
[58] Field of Search ..................................... 340/432, 539; 455/34.1, 34.2, 63

[56] References Cited

U.S. PATENT DOCUMENTS

| | | | |
|---|---|---|---|
| 4,694,485 | 9/1987 | Iwase | 455/34.2 |
| 4,887,249 | 12/1989 | Thinesen | 340/432 |
| 4,903,322 | 2/1990 | Inahara | 455/34.1 |
| 5,008,647 | 4/1991 | Brunt et al. | 340/432 |
| 5,511,435 | 4/1996 | Kitamura et al. | 340/432 |

*Primary Examiner*—Jeffery Hofsass
*Assistant Examiner*—Julie B. Lieu
*Attorney, Agent, or Firm*—Frishauf, Holtz, Goodman, Langer & Chick

[57] ABSTRACT

In a traveling state calculating device, a sensing and sending unit senses the number of rotations of a wheel and sends by radio a signal indicative of the sensed number of rotations of the wheel to a calculating and displaying unit to thereby calculate and display the traveling speed and the covered distance. When the traveling state cannot be detected accurately due to interference of radio signals from other devices, the present traveling state calculating device senses the interference, and changes the frequency of the radio signal being used to another frequency to prevent continuation of the interference so as to calculate the traveling state accurately.

16 Claims, 9 Drawing Sheets

TRAVELING STATE CALCULATING DEVICES

BACKGROUND OF THE INVENTION

The present invention relates to traveling state detection devices which detect the traveling speed of a vehicle and the distance covered by the vehicle, and more particularly to a traveling state detection device which receives a radio signal related to the traveling state of the vehicle to calculate its traveling speed and covered distance.

Generally, a cycle computer including a traveling state detection device is known which calculates the traveling speed of a bicycle and the distance covered by the bicycle from the number of rotations of a wheel of the bicycle.

The cycle computer, for example, includes a number-of-rotations sensing means which senses the number of rotations of a wheel and calculating and displaying means which calculates the traveling speed of the bicycle and its covered distance from the sensed number of rotations of the wheel and the tire size and displays them.

The number-of-rotations sensing means is provided near the wheel or the axis of the wheel. The calculating and displaying means is attached, for example, to the handle of the bicycle such that the rider may view the displaying means easily. That is, the number-of-rotations sensing means is provided separated from the calculating and displaying means, so that signals are required to be sent/received between them.

To this end, a radio communication type cycle computer has been proposed conventionally in which signals are delivered by radio between the number-of-rotations sensing means and the calculating and displaying means.

In this cycle computer, the number-of-rotations sensing means senses the number of rotations of the wheel and sends a radio signal indicative of the sensed number of rotations, which is received by the calculating and displaying means. When bicycles with such cycle computer are close to each other, their number-of-rotations sensing means send radio signals of the same type. Thus, each calculating and displaying means would receive those signals in an interfering state and display an inaccurate value of the number of rotations of the wheel. That is, when bicycles with such cycle computers are close to each other, cycle computers would not function properly.

SUMMARY OF THE INVENTION

It is therefore an object of the present invention to provide a traveling state calculating device for sensing and displaying the travelling state of a vehicle while preventing interference from signals of other devices.

In order to achieve the above object, the present invention provides a traveling state calculating device comprising:

traveling state detecting means for detecting a signal corresponding to the traveling state of a vehicle;

sending means for sending the detected signal on a signal having one of a plurality of different frequencies;

receiving means for receiving the signal sent by the sending means;

determining means for determining whether a signal different from the signal sent by the sending means has been received during the reception of the signal from the sending means by the receiving means; and changing means for changing the frequency of the signal handled by the sending and receiving means to a different frequency when the determining means has determined that the different signal has been received.

The use of such arrangement serves to calculate the traveling state of the vehicle efficiently and accurately.

DETAILED DESCRIPTION OF THE PREFERRED EMBODIMENT

A first embodiment of a traveling state detecting device according to the present invention applied to a cycle computer will be described with respect to the drawings.

Figure 1:
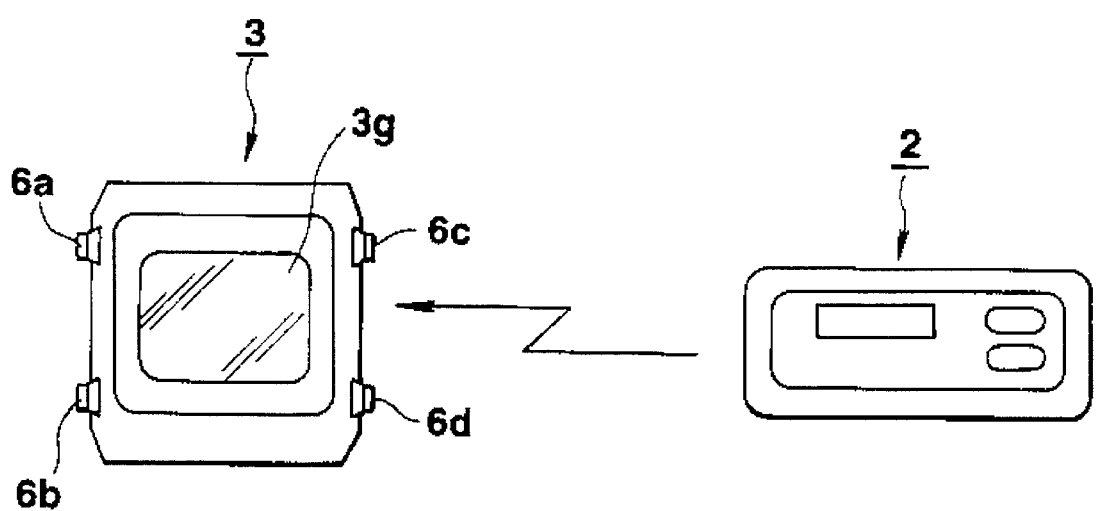
FIG. 1 is a front view of a first embodiment of a cycle computer which includes a traveling state detecting device according to the present invention.

As shown in FIG. 1, the cycle computer includes a traveling state detecting device which, in turn, includes a sensing and sending unit 2 which senses the rotation of a front wheel 1 of a vehicle, more particularly, a bicycle A and sends a pulse signal indicative of the rotation of the front wheel 1; and a calculating and displaying unit 3 which receives the pulse signal, calculates the traveling speed of the bicycle and the distance covered by the bicycle, and displays those data items.

Figure 2:
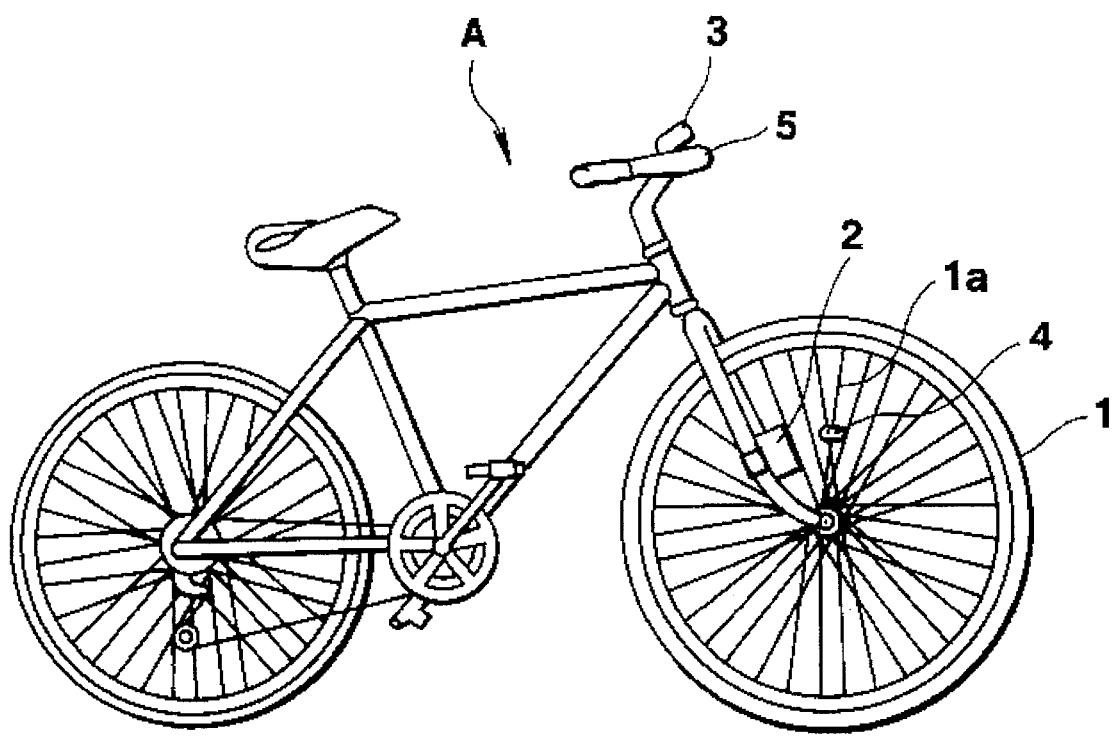
FIG. 2 is a side view of a bicycle with the cycle computer.

As shown in FIG. 2, the sensing and sending unit 2 is attached to the bicycle A at a position near the rotational orbit of a magnet 4 attached to one of the spokes 1a of the front wheel 1 of the bicycle A. The sensing and sending unit 2 senses the passage of the magnet 4 by the sensing and sending unit 2 at each one rotation of the front wheel 1.

Figure 3:
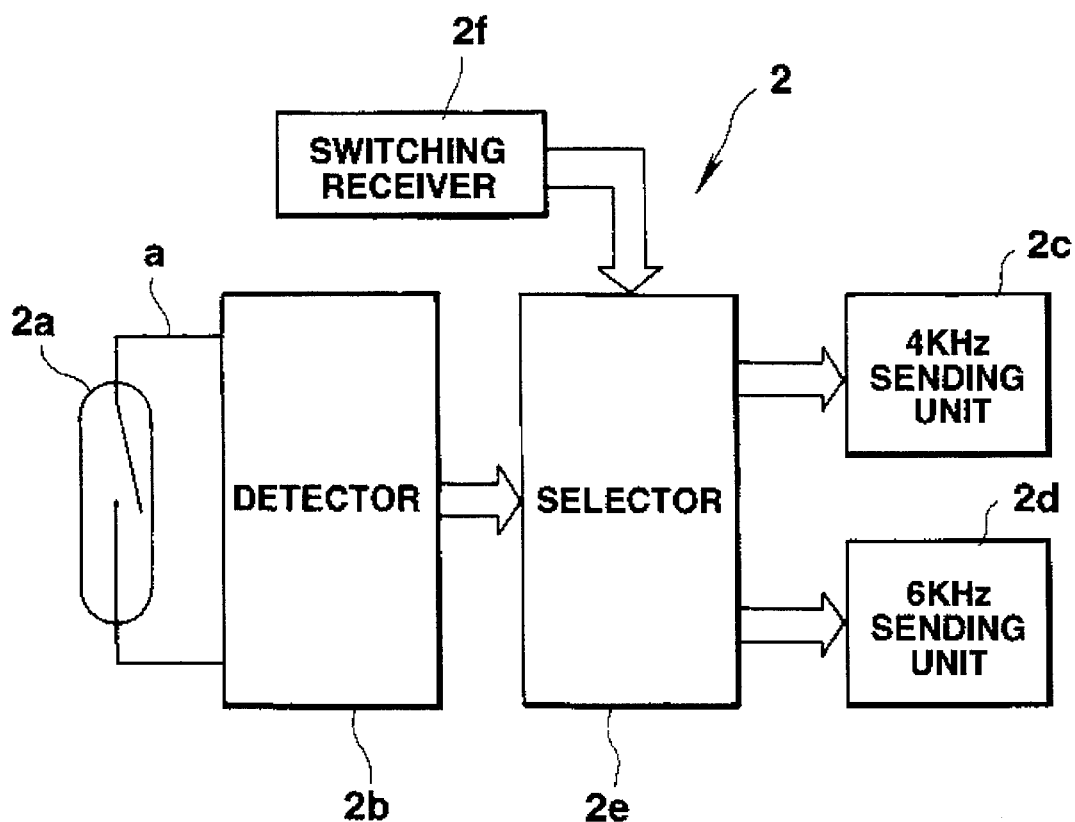
FIG. 3 is a block diagram of a diagrammatic structure of a sensing and sending unit of the cycle computer.

As shown in a block diagram of FIG. 3, the sensing and sending unit 2 basically includes a normally open reed switch 2a which is closed by the flux of the magnet 4 passing by the sensing and sending unit 2; a detector 2b which detects the closing of the reeds of the switch 2a; a 4 KHz sending unit 2c which sends a signal of 4 KHz; a 6 KHz sending unit 2d which sends a signal of 6 KHz; a selector 2e which selects one of the sending units 2c, 2d for sending purposes; and a switching receiver 2f which receives an external switching signal which instructs the selector 2e to select one of the sending units 2c, 2d.

Figure 8:
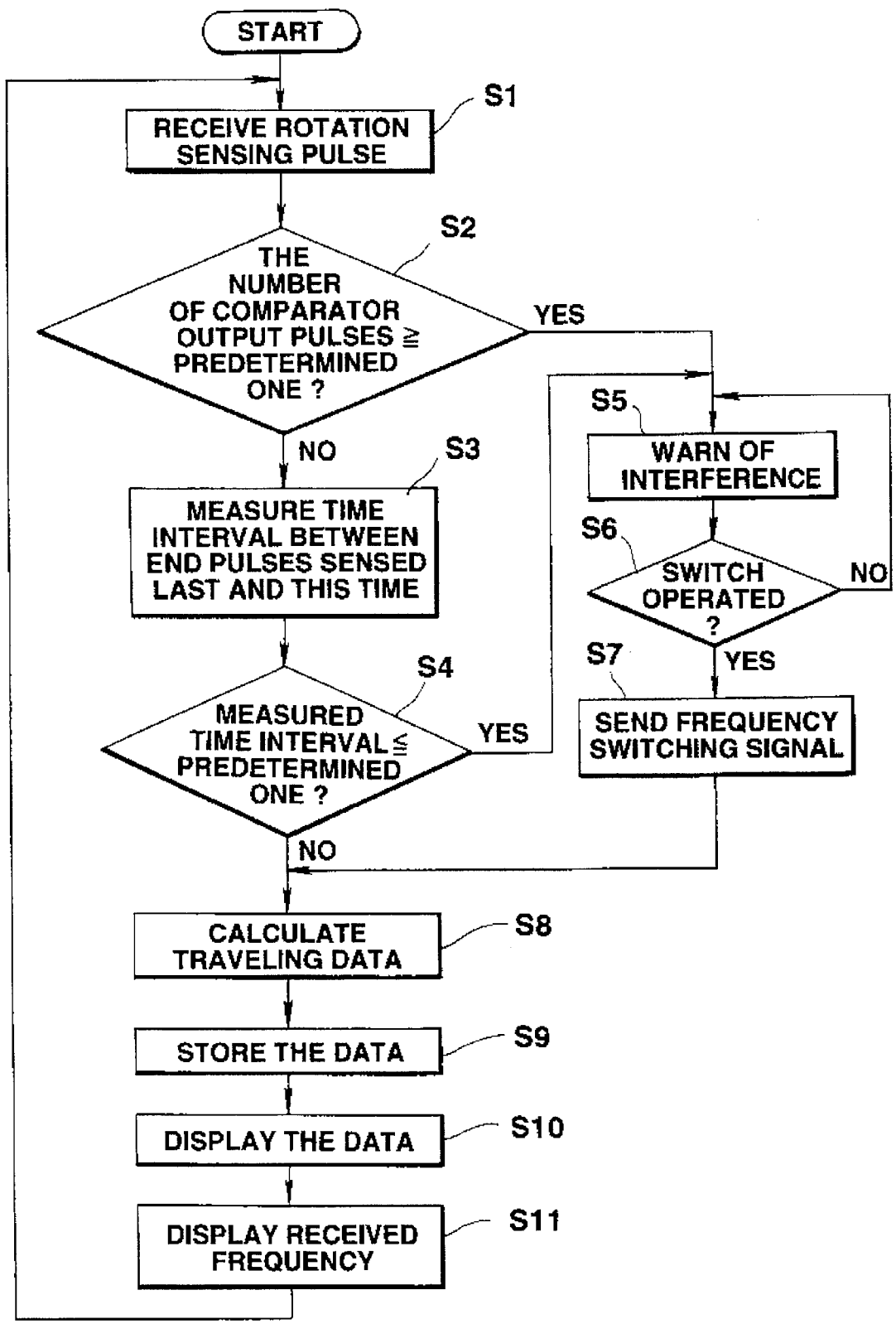
FIG. 8 is a flowchart indicative of the operation of the cycle computer.

As shown in FIG. 8, the detector 2b is adapted to receive a reed switch signal a generated due to the closing of the reed switch 2a due to the magnet 4 passing by the sensing and sending unit 2 to thereby cause an oscillator (not shown) to generate a clock signal b having a predetermined period to turn on/off a transistor (not shown) repeatedly for a short time. This causes an electromagnetic induction coil (not shown) of the selected one of the sending units 2c, 2d to output a resonant pulse c of a short duration time directly after passage of the magnet 4 by the sensing and sending unit 2. That is, the sensing and sending unit 2 outputs a resonant pulse c including an electromagnetic induction signal at each complete rotation of the front wheel 1 of the bicycle A.

The calculating and displaying unit 3 is attached to the handle 5 of the bicycle A, as shown in FIG. 2, or to a band (not shown) which is wound around a wrist of the rider like a wrist watch.

Figure 4:
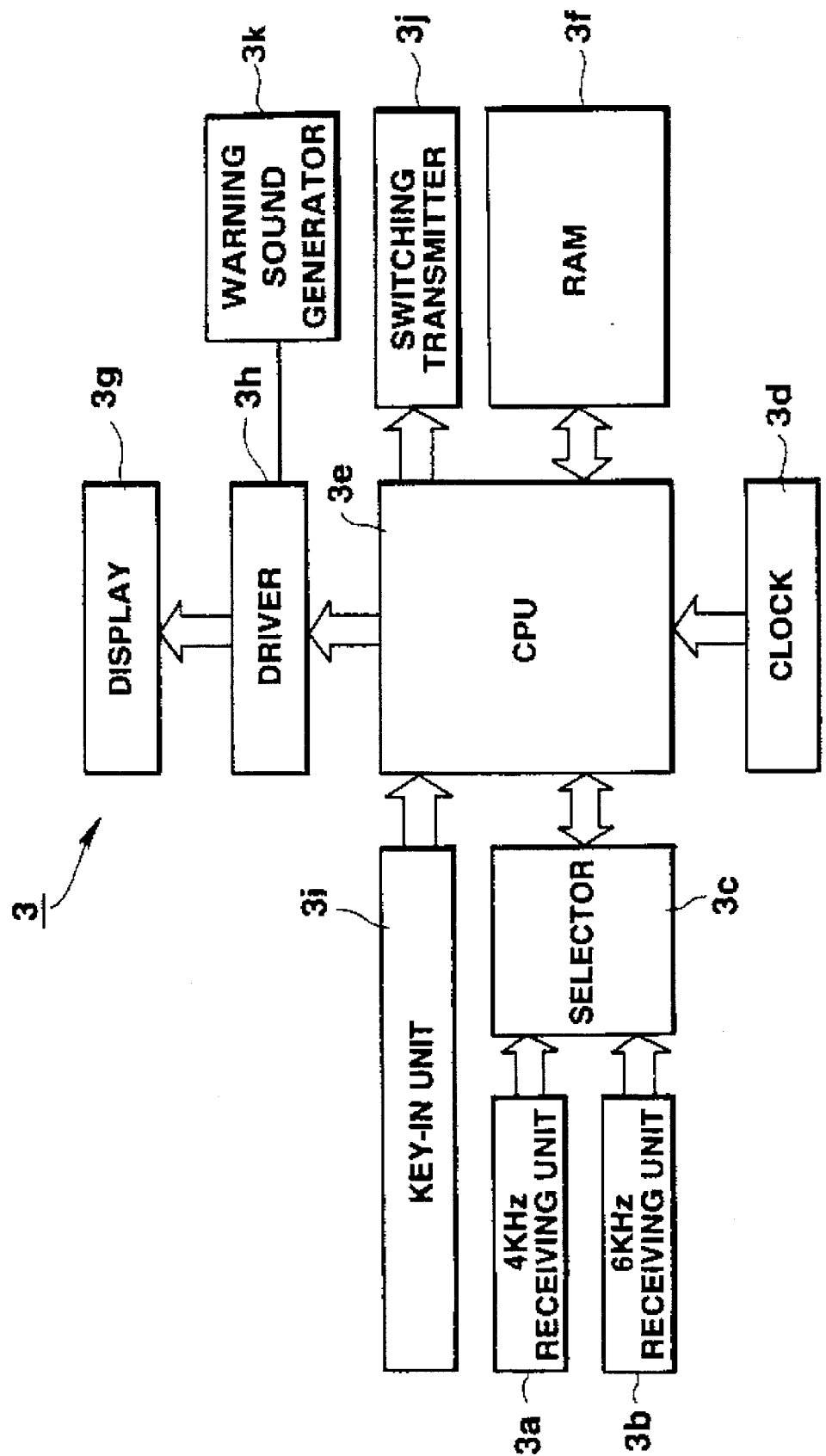
FIG. 4 is a block diagram of a diagrammatic structure of a calculating and displaying unit of the cycle computer.

As shown in FIG. 4, the calculating and displaying unit 3 includes 4 KHz and 6 KHz receiving units 3a and 3b which receive resonant pulses c sent from the 4 KHz and 6 KHz sending units 2c and 2d, respectively; a selector 3c which selects one of the receiving units 3a and 3b for receiving purposes; a clock 3d which generates signals of the current time and an elapsed time from the start of the measurement; a central processing unit (CPU) 3e which calculates the traveling speed of the bicycle and the distance covered by the bicycle; a RAM 3f; a liquid crystal display (LCD) 3g which displays the result of the calculation of the CPU 3e; a display driver 3h which drives the display 3g; a key-in unit 3i which sends data to the CPU 3e; and a switching transmitter 3j which transmits a switching signal to the switching receiver 2f of the sensing and sending unit 2.

A warning sound generator 3k for warning a rider of an interfering signal may also be included.

Figure 7:
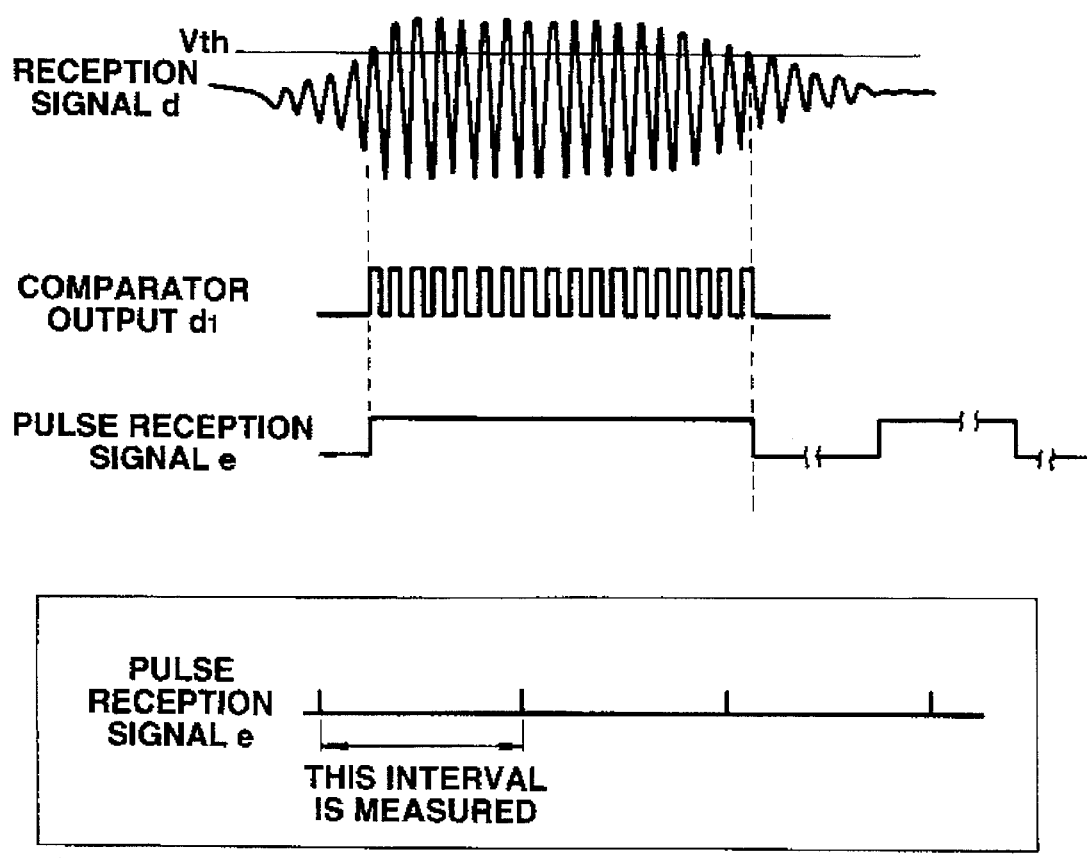
FIG. 7 is a timing chart indicative of the receiving operation of the calculating and displaying unit.

As shown in FIG. 7, when the 4 KHz or 6 KHz receiving unit 3a or 3b receives a resonant pulse c output from the 4 KHz or 6 KHz sending unit 2c or 2d, it generates a reception signal d due to the electromagnetic induction of the electromagnetic induction coil (not shown).

A reception side detector (not shown) provided in the CPU 3e receives the reception signal d to cause a comparator (not shown) provided therein to generate a comparator signal d1 corresponding to a portion of the reception signal d which exceeds a threshold level Vth, and to generate a pulse reception signal e based on the comparator output d1.

The pulse reception signal e is input to the CPU 3e at the timing when the magnet 4 passes by the sensing and sending unit 2 due to the front wheel 1 making a complete rotation; that is, each time the front wheel 1 makes a complete rotation.

The key-in unit 3i includes four first-fourth winding-crown type switches 6a, 6b, 6c and 6d of the calculating and displaying unit 3 of FIG. 1. The first switch 6a is used for time setting purposes like a winding crown of a general wrist watch. The second switch 6b is used to reset data on the distance covered by the bicycle and to input the starting and stopping signals to a stopwatch (not shown) in the key-in unit. The third switch 6c is used to input data on the size of the tires of the bicycle. When the third switch 6c is once depressed, beforehand stored data on the sizes of tires for use with the bicycle is displayed as a menu so that one tire size is selected among the menu. The fourth (changeover) switch 6d is used to change a frequency. By depression of the fourth switch 6d, a select signal is input to the selector 3c and the switching transmitter 3j such that the selector 3c selects one of the 4 KHz and 6 KHz receiving units 3a and 3b and that the switching transmitter 3j sends a switching signal to the switching receiver 2f of the sensing and sending unit 2.

Figure 5:
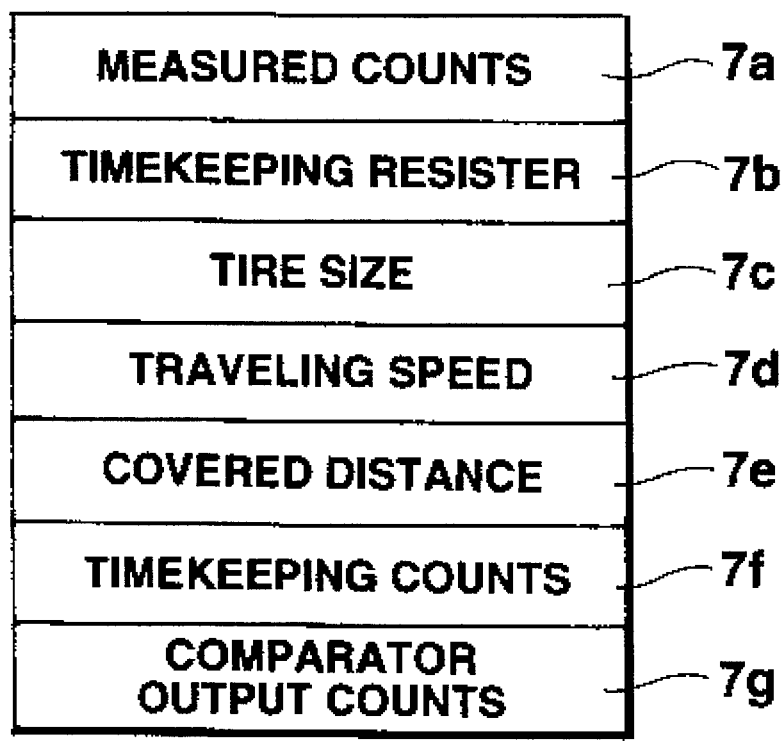
FIG. 5 shows the structure of a memory area of a RAM of the calculating and displaying unit.
Figure 6:
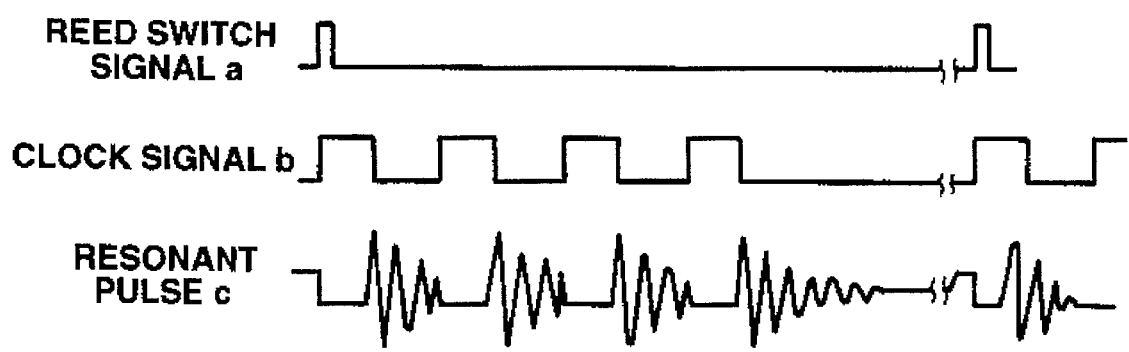
FIG. 6 is a timing chart indicative of the sending operation of the sensing and sending unit.

As shown in FIG. 5, the RAM 3f includes a count area 7a which stores data on the number of counted received pulse signals; a timekeeping register area 7b which stores data on an elapsed time from the state of the measurement; a tire size area 7c which stores data on a tire size input by the third switch 6c; a traveling speed area 7d which stores data on a traveling speed calculated on the basis of the interval of the pulse signals; a covered distance area 7e which stores data on a covered distance calculated on the basis of the number of pulse signals, mentioned above; a timekeeping count area 7f which stores data on the interval of the pulse signals; and a comparator output count area 7g which stores data on the number of pulses output from the comparator or the number of pulses for one pulse signal.

The operation of the cycle computer, thus constructed, performed when interference occurs will be described below with respect to a flowchart of FIG. 8.

When the bicycle A is traveling, the magnet 4 passes by the sensing and sending unit 2 due to rotation of the front wheel 1, so that the sensing and sending unit 2 outputs a resonant pulse c.

The calculating and displaying unit 3 receives a reception signal (rotation sensing pulse) d generated due to one rotation of the front wheel 1 (step S1). The receiving unit 3a (3b) of the calculating and displaying unit 3 converts the reception signal d to a comparator output d1 corresponding to that portion of the reception signal which exceeds the predetermined threshold Vth and inputs the comparator output d1 to the CPU 3e. The CPU 3e counts the number of pulses of the comparator output d1 and stores the counts in the comparator output count area 7g of the RAM 3f.

The counted number of pulses is compared with the predetermined number of pulses (in this case, 18+1=19)(step S2). When the former is larger than the latter, it is determined that an interference state where a plurality of overlapping pulse signals is received is occurring.

The predetermined number of pulses is determined when the resonant pulse c is generated in the sensing and sending unit 2. In this embodiment, for example, the number of pulses of the comparator output d1 is 18 while the predetermined number of pulses is 19 which is the sum of the number of pulses of the comparator output d1 plus 1.

When the number of pulses of the comparator output d1 is smaller than the predetermined number of pulses, the time interval between the end pulses of the comparator outputs d1 sensed last and this time is measured (step S3) and stored in the timekeeping area 7f of the RAM. The time interval stored in the timekeeping area 7f and a predetermined time interval are compared (step S4). When the former is shorter than the latter, it is determined that interference is occurring.

Since the travelling speed of the bicycle A has a limit, a time interval slightly shorter than the time required for the front wheel 1 to make a complete rotation within the limit is used as the predetermined time. When the time interval between the end pulses of the last and current comparator outputs d1 is shorter than the predetermined time interval, the traveling speed of the bicycle A exceeds its limit. Thus, it is considered that the normal comparator output d1 interferes with another comparator output. Thus, if the time interval, data on which is stored in the timekeeping area 7f, is shorter than the predetermined time interval, the CPU 3e determines that interference is occurring.

If it is determined at step S2 or S4 that interference is occurring, the display 3g displays a warning of the occurrence of interference and the warning sound generator 3k reports the occurrence of the interference to the rider (step S5).

It is then determined whether the rider has operated the changeover switch 6*d* in accordance with the warning from the display 3*g* and the warning sound generator (step S6). When the rider operates the changeover switch 6*d*, the selector 3*c* switches the receiving unit which receives a signal from the sensing and sending unit 2 from that of the 4 KHz and 6 KHz receiving units 3*a* and 3*b* used so far to the other. At the same time, the switching transmitter 3*j* sends a switching signal to the switching receiver 2*f* of the sensing and sending unit 2 such that the selector 2*e* of the sensing and sending unit 2 switches that of the sending units 2*c* and 2*d* used so far to the other to thereby switch the frequency of the transmitted signal (step S7).

When it has been determined that no interference is occurring or it has been determined that interference is occurring and the transmitted/received signal frequency is changed, control passes to the next step S8, where the travelling speed and the covered distance are calculated on the basis of the interval and number of the pulse reception signals e1 (step S8).

Data on the calculated travelling speed and covered distance is stored in the travelling speed and covered distance areas 7*d* and 7*e*, respectively, of the RAM 3*f* (step S9). The stored data on the travelling speed and covered distance is output from the CPU 3*e* through the display driver 3*h* to the display 3*g* so as to be displayed in the form of numerals on the display (step S10). Simultaneously, the current transmitted/received frequencies are also displayed on the display 3*g* (step S11). Control then returns to the step S1 which receives a rotation detection pulse.

As described above, according to the cycle computer of the first embodiment, pulse signals (a resonant pulse c, a reception signal d, a comparator output d1) having predetermined pulse frequencies are used for transmission of signals indicative of the number of rotations of the bicycle wheel from the sensing and sending unit 2 to the calculating and displaying unit 3. Thus, overlapping of pulse signals from different sensing and sending units 2 is easily determined by counting the number of pulses of the pulse signals in the calculating and displaying unit.

In addition to the determination of interference using the number of pulses, interference is surely determined by measurement of the interval between the pulse signals and comparison of that interval with the predetermined interval of time.

As described above, the sensing and sending unit 2 includes the plurality of sending units 2*c*, 2*d* capable of sending signals of different frequencies, respectively, while the calculating and displaying unit 3 includes the plurality of receiving units 3*a*, 3*b* capable of receiving signals of different frequencies, respectively. The sending units 2*c*, 2*d* and the receiving units 3*a*, 3*b* are switched when used, so that when interference is sensed, the frequency of the signal being used is changed to another to prevent the interference from continuing any longer.

A second embodiment of the cycle computer which includes a traveling state detection device according to the present invention will be described next. The cycle computer of the second embodiment has substantially the same structure as that of the first embodiment. That is, the cycle computer of the second embodiment includes a sensing and sending unit 2 and a calculating and displaying unit 3 like the cycle computer of the first embodiment. Those sensing and sending unit 2 and calculating and displaying unit 3 have the structures of FIGS. 3 and 4, respectively.

The cycle computer of the second embodiment is different from that of the first embodiment in that the selector 3*c* and switching transmitter 3*j* of the calculating and displaying unit 3 of FIG. 4 are operated in accordance with signals from the CPU 3*e*. More specifically, in the cycle computer of the first embodiment the selector 3*c* and the switching transmitter 3*j* changes one of the 4 KHz and 6 KHz receiving units 3*a* and 3*b* used so far to the other in accordance with the operation of the changeover switch 6*d* to send a switching signal to the switching receiver 2*f* of the sensing and sending unit 2. In contrast, in the cycle computer of the second embodiment, when the CPU 3*e* determines interference, as mentioned above, the CPU 3*e* outputs a signal to the selector 3*c* and the switching transmitter 3*j* such that the selector 3*c* changes that of the 4 KHz and 6 KHz receiving units 3*a* and 3*b* used so far to the other to cause the switching transmitter 3*j* to send a switching signal to the switching receiver 2*f* of the sensing and sending unit 2.

Thus, when interference occurs in the cycle computer, the rider is not required to depress the changeover switch 6*d* to change the frequency. That is, the frequency of the transmitted/received signal being used is changed to the other to thereby prevent the interference from continuing any longer.

Figure 9:
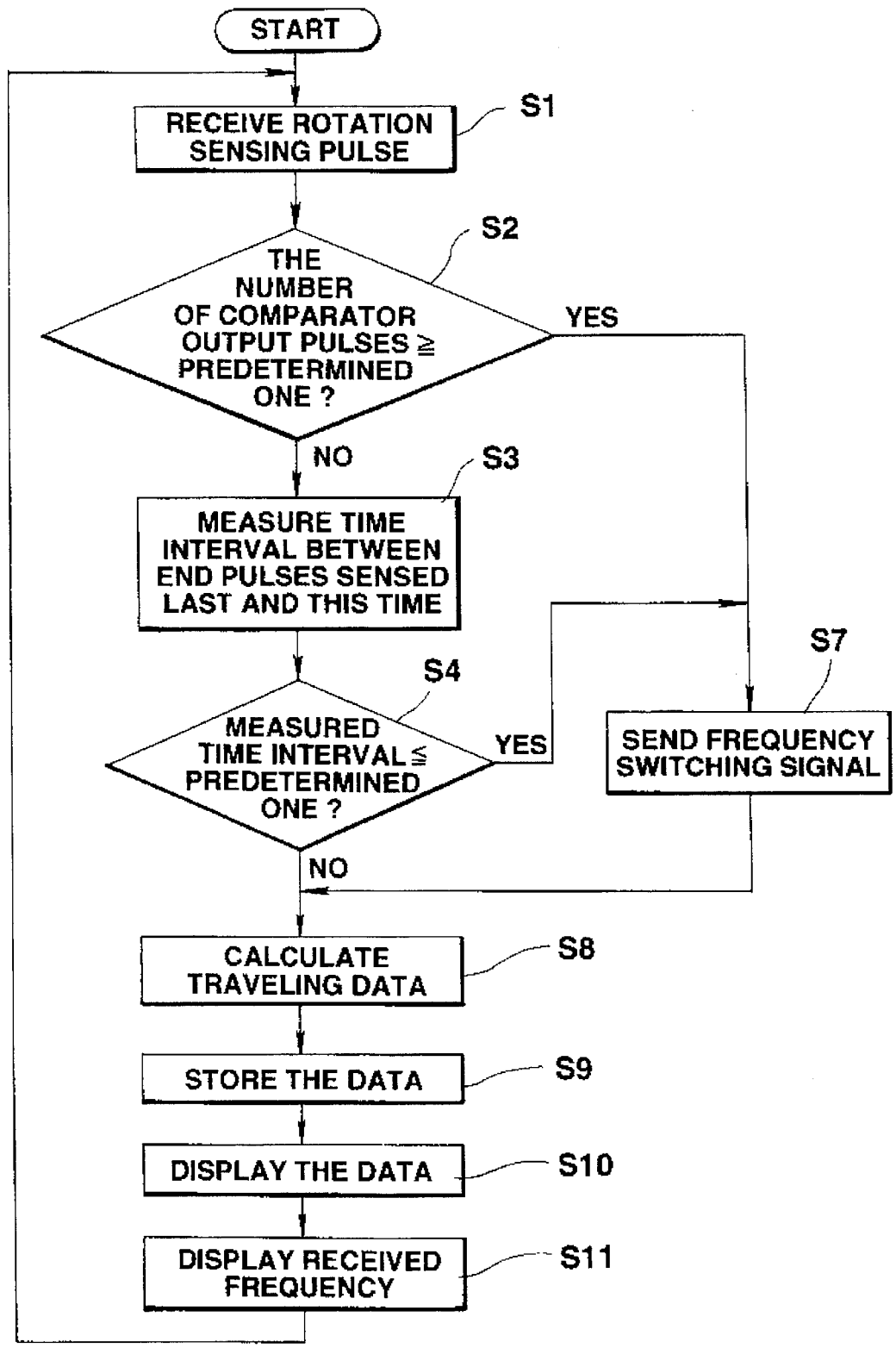
FIG. 9 is a flowchart indicative of the operation of a second embodiment of a cycle computer which includes a traveling state detecting device according to the present invention.

FIG. 9 is a flowchart indicative of prevention of the continuation of interference in the cycle computer of the second embodiment. In FIGS. 8 and 9, steps where similar processes are performed in the operations of the cycle computers of the first and second embodiments are denoted by the same reference symbol and further description thereof will be omitted. As shown in FIG. 9, in the processing of interference in the cycle computer of the second embodiment, a warning of the interference at step S5 of the process performed in the cycle computer of the first embodiment and the switching of the changeover switch 6*d* at its step S6 are not required.

When the CPU 3*e* determines interference, the selector 3*c* changes the frequency of the signal used so far to the other and the switching transmitter 3*j* transmits a switching signal.

As described above, the cycle computer of the second embodiment produces advantages similar to those produced by the cycle computer of the first embodiment. When interference occurs, the cycle computer of the second embodiment automatically changes the frequency of the signal being used to the other to thereby prevent the interference from continuing any longer. Thus, the user is neither required to consider the interference nor given incorrect data due to the interference. He is not required to perform some operations for prevention of continuation of the interference either.

While in the cycle computers of the first and second embodiments the use of the two frequencies of 4 and 6 KHz has been illustrated, other frequencies may be used instead. The number of frequencies used is not limited to 2. Three or more frequencies may be used to prevent continuation of interference among many cycle computers used. In this case, a switching signal transmitted from the switching transmitter 3*j* is required to include information on a frequency to be used in the switching signal sent by the switching transmitter 3*j* or to give turns of use to the frequencies such that the sensing and sending unit and the calculating and displaying unit select the same frequency.

While in the above embodiments the electromagnetic induction frequency is illustrated as being changed in the occurrence of interference, use of a combination of different radio signals serves to prevent continuation of interference. For example, a sending unit and a receiving unit for an electromagnetic induction signal and an infrared signal may be provided such that when the occurrence of interference is determined, the electromagnetic induction signal being used is changed to the infrared signal to be used newly and vice versa.

In addition to the above embodiments, continuation of interference can be prevented in various forms without departing from the spirit and main features of the present invention.

What is claimed is:

1. A traveling state detecting device comprising:

traveling state detecting means for detecting a traveling state of a vehicle;

sending means for generating a traveling state signal corresponding to the detected traveling state of the vehicle, and for sending said traveling state signal at a frequency selecting from among a plurality of different frequencies;

receiving means for receiving the traveling state signal sent by said sending means;

interference detecting means for detecting reception by said receiving means of an interfering signal having the same frequency as the traveling state signal sent by said sending means; and changing means for changing the frequency of the traveling state signal sent by said sending means to another frequency selected from among said plurality of frequencies when said interference detecting means detects reception by said receiving means of the interfering signal.

2. A traveling state detecting device according to claim 1, wherein:

said sending means comprises a plurality of sending units, each said sending unit being provided for sending the traveling state signal at a respective one of said plurality of different frequencies;

said receiving means comprises a plurality of receiving units, each said receiving unit being provided for receiving the traveling state signal at a respective one of said plurality of different frequencies; and said changing means comprises means for changing the sending unit of said sending means which is sending the traveling state signal and means for changing the receiving unit of said receiving means which is receiving the traveling state signal, when said interference detecting means detects reception by said receiving means of the interfering signal.

3. A traveling state detecting device according to claim 1, wherein said sending means generates and sends an electromagnetic induction traveling state signal.

4. A traveling state detecting device according to claim 1, wherein said sending means generates and sends an infrared traveling state signal.

5. A traveling state detecting device according to claim 1, further comprising means for attachment to a bicycle and calculating means for calculating a traveling state of said bicycle based on the traveling state signal received by said receiving means.

6. A traveling state detecting device according to claim 1, wherein:

said traveling state detecting means comprises wheel rotation detecting means for detecting rotation of a wheel of the vehicle;

said sending means comprises generating means for generating traveling state signals based on said detected rotation of the wheel of the vehicle, said traveling state signals being generated with a predetermined time interval therebetween; and said interference detecting means comprises measuring means for measuring a receiving time interval between the traveling state signals received by said receiving means, and means for detecting reception of an interfering signal when said receiving time interval is less than the predetermined time interval at which said generating means generates the traveling state signals.

7. A traveling state detecting device according to claim 1, wherein:

said traveling state detecting means comprises wheel rotation detecting means for detecting rotation of a wheel of the vehicle;

said sending means comprises generating means for generating traveling state signals based on said detected rotation of the wheel of the vehicle, said traveling state signals each being generated to contain a predetermined number of pulses; and said interference detecting means comprises pulse counting means for counting a number of pulses contained in the traveling state signals received by said receiving means, and means for detecting reception of an interfering signal when said number of pulses counted by said pulse counting means is greater than the predetermined number of pulses contained in the traveling state signals generated by said generating means.

8. A traveling state detecting device comprising:

traveling state detecting means for detecting a traveling state of a vehicle;

sending means for generating a traveling state signal corresponding to the detected traveling state of the vehicle, and for sending said traveling state signal at a frequency selecting from among a plurality of different frequencies;

receiving means for receiving the traveling state signal sent by said sending means;

interference detecting means for detecting reception by said receiving means of an interfering signal having the same frequency as the traveling state signal sent by said sending means;

reporting means for reporting detection of an interfering signal when said interference detecting means detects the interfering signal; and changing means for changing the frequency of the traveling state signal sent by said sending means to another frequency selected from among said plurality of frequencies when said interference detecting means detects reception by said receiving means of the interfering signal.

9. A traveling state detecting device according to claim 8, wherein:

said sending means comprises a plurality of sending units, each said sending unit being provided for sending the traveling state signal at a respective one of said plurality of different frequencies;

said receiving means comprises a plurality of receiving units, each said receiving unit being provided for receiving the traveling state signal sent by said sending means at a respective one of said plurality of different frequencies; and said changing means comprises means for enabling a driver of the vehicle to manually change the sending unit of said sending means which is sending the traveling state signal and the receiving unit of said receiving means which is receiving the traveling state signal, when said reporting means reports detection of the interfering signal by said interference detecting means.

10. A traveling state detecting device according to claim 8, wherein said sending means generates and sends an electromagnetic induction traveling state signal.

11. A traveling state detecting device according to claim 8, wherein said sending means generates and sends an infrared traveling state signal.

12. A traveling state detecting device according to claim 8, wherein said reporting means comprises display means for displaying an interfering signal detected message to the driver of the vehicle when said interference detecting means detects the interfering signal.

13. A traveling state detecting device according to claim 8, wherein said reporting means comprises warning sound generating means for generating an interfering signal detected warning sound when said interference detecting means detects the interfering signal.

14. A traveling state detecting device according to claim 8, further comprising means for attachment to a bicycle and calculating means for calculating a traveling state of said bicycle based on the traveling state signal received by said receiving means.

15. A traveling state detecting device according to claim 8, wherein:

said traveling state detecting means comprises wheel rotation detecting means for detecting rotation of a wheel of the vehicle;

said sending means comprises generating means for generating traveling state signals based on said detected rotation of the wheel of the vehicle, said traveling state signals being generated with a predetermined time interval therebetween; and said interference detecting means comprises measuring means for measuring a receiving time interval between the traveling state signals received by said receiving means, and means for detecting reception of an interfering signal when said receiving time interval is less than the predetermined time interval at which said generating means generates the traveling state signals.

16. A traveling state detecting device according to claim 8, wherein:

said traveling state detecting means comprises wheel rotation detecting means for detecting rotation of a wheel of the vehicle;

said sending means comprises generating means for generating traveling state signals based on said detected rotation of the wheel of the vehicle, said traveling state signals each being generated to contain a predetermined number of pulses; and said interference detecting means comprises pulse counting means for counting a number of pulses contained in the traveling state signals received by said receiving means, and means for detecting reception of an interfering signal when said number of pulses counted by said pulse counting means is greater than the predetermined number of pulses contained in the traveling state signals generated by said generating means.

* * * * *